United States Patent [19]
Southall

[11] Patent Number: 6,138,834
[45] Date of Patent: Oct. 31, 2000

[54] RECOVERY APPARATUS FOR DRILLING AND EXCAVATION APPLICATION AND RELATED METHODS

[75] Inventor: Ricky Southall, Marrero, La.

[73] Assignee: Sun Drilling Corporation, Belle Chasse, La.

[21] Appl. No.: 09/227,523

[22] Filed: Jan. 8, 1999

[51] Int. Cl.[7] ............................... B03B 7/00; E02F 1/00
[52] U.S. Cl. ........................ 209/17; 209/173; 209/314; 209/725; 175/206; 37/195
[58] Field of Search ............................ 209/12.1, 17, 18, 209/172, 172.5, 173, 314, 724, 725; 175/66, 206; 37/195, 307

[56] References Cited

U.S. PATENT DOCUMENTS

| | | | |
|---|---|---|---|
| 3,642,133 | 2/1972 | Venanzetti | 209/314 |
| 5,080,807 | 1/1992 | Carr et al. | 209/17 X |
| 5,436,384 | 7/1995 | Grant et al. | 209/17 X |
| 5,476,994 | 12/1995 | Trezek | 209/17 X |
| 5,814,230 | 9/1998 | Willis et al. | 209/5 X |

FOREIGN PATENT DOCUMENTS

| | | | |
|---|---|---|---|
| 318231 | 5/1989 | European Pat. Off. | 209/17 |
| 2550103 | 2/1985 | France . | |

*Primary Examiner*—Tuan N. Nguyen
*Attorney, Agent, or Firm*—Reed Smith Shaw & McClay LLP

[57] ABSTRACT

A recovering system includes at least one shale shaker having at least one screen and a hydrocyclone manifold system; a recovery tank having a cavity and a base, the tank having at least one inlet and at least one outlet, the recovery tank having at least one agitation system for creating force within the cavity of the recovery tank; and at least one recovery shaker having at least one screen.

39 Claims, 3 Drawing Sheets

RECOVERY APPARATUS FOR DRILLING AND EXCAVATION APPLICATION AND RELATED METHODS

FIELD OF INVENTION

The present invention relates to a recovery apparatus for drilling and excavation applications comprising a recovery tank, at least one pump and at least one motor. The invention also relates to a continuous recovery system for recycling solid particulate materials and related methods.

BACKGROUND OF THE INVENTION

During the drilling of a well, it is commonplace to process the drilling mud returns to remove undesired drilled cuttings or solids utilizing a shale shaker or the like. The shale shaker is the primary piece of equipment which separates the drilling solids from the mud. It is also desirable to produce a mud with a low drilled solids content. By recycling the large drilled solids in the shale shaker, thin sizes of drilled solids are produced and thereby build up the solids content of the mud. As the solids content increases, the mud must be thinned by adding additional water which necessitates the addition of more weighting material to maintain the mud at its desired weight.

In addition to removing undesired large drilled solids and producing a mud with a low drilled solids content, it is also desirable to recover and recycle drilling fluids and solid particulate material such as copolymer spheres or beads. The beads are usually circulated through the system once and then discarded. It is economically beneficial to recycle these potentially costly beads during the drilling process. It is conventional to screen the mud in a shale shaker having screens ranging in size from 10 to 200 mesh. Thus, any solid particulate materials having a particle size larger than the shale shaker screen would be removed from the system with the drilled solids.

Efforts have been made to deposit the drilled solids and copolymer beads into a tank containing a liquid which has a specific gravity less than that of the drilled solids but greater than that of the copolymer beads or spheres. As a result, the copolymer beads or particulate materials migrate or float to the top of the liquid and can then be skimmed from the upper portion of the vessel and then returned to the well for recirculation. In these systems, the flotation liquid in the tank requires an aqueous solution of sodium carbonate or any number of soluble salts such as sodium chloride or calcium chloride to induce the separation of the beads, liquid and drilled solids. The introduction of the more efficient shale shakers that produce finer solids has made this flotation system ineffective. This flotation system did not anticipate the problem of fine solids building up in the separating fluid zone. As these solids continue to build up, the separating liquid becomes extremely viscous or thick and will not allow the copolymer spheres to be effectively separated from the drilled cuttings. Furthermore, the sodium carbonate on the surface of the copolymer spheres which are returned to the drilling fluid will create a problem for the drilling fluid known as carbonate contamination. Carbonate contamination produces carbonic acid which reacts with the alkaline products in the drilling fluid which in turn reduce the effectiveness of drilling fluid thinners such as lignosulfonates and allow the drilling fluids to become increasingly thick and unacceptable.

SUMMARY OF THE INVENTION

The present invention relates to a recovery apparatus for drilling and excavation applications. The apparatus comprises a recovery tank, at least one pump and at least one motor. The recovery tank has an inlet and outlet for allowing the entrance and exit of drilled solids, drilling fluids, solid particulate materials and mixtures thereof. For purposes of this invention, drilled solids are pieces of formation that are the result of the chipping and/or crushing action of the drill bit during the drilling and excavation process. Drilling fluids are circulating fluid used in rotary drilling to perform various functions during drilling operations. Solid particulate materials include, but are not limited to, lubricating copolymer beads. The recovery tank of the present invention has a cavity and a base presenting an inclined surface to the cavity. The base expedites the separation of the components of the mixture. The pump is used for pumping drilled solids, drilling fluids, solid particulate materials and mixtures thereof into the inlet of the tank, through the cavity and out of the outlet of the tank. The pump also creates the centrifugal force that allows the separation of the components in the mixture. The motor provides power to operate the pump and recovery apparatus.

In one embodiment of the invention, the recovery apparatus is further comprised of a motor control panel, a top portion for enclosing the cavity of the tank and a framework for supporting the tank, the pump and the motor. The motor control panel is an electrical unit used to control and power-up the electrical components of the recovery system of the present invention.

In another embodiment of the invention, the recovery tank has three walls and each of the three walls have upper and lower ends. The upper ends of the well are connected to the top portion of the tank to form the cavity. The lower ends of at least two of the walls are tapered toward one another thereby forming the cavity within the tank.

In still another embodiment, the recovery tank comprises four walls, each of the four walls has upper and lower ends and said lower ends of two walls are tapered toward one another. In yet another embodiment, the recovery tank comprises four walls, each of the four walls has upper and lower ends and the lower ends of the four walls are tapered toward one another.

In a further embodiment, the recovery apparatus has two motors and two pumps, whereby the second motor and second pump function as a backup.

In still a further embodiment, the recovery tank comprises at least one suction manifold and at least one discharge manifold. In yet a further embodiment, the recovery tank comprises a dump valve for disposing of the drilled solids.

The present invention also relates to a continuous recovery system for suspending, separating and collecting solid particulate material from drilled solids, drilling fluid and mixtures thereof during drilling and excavation applications. The system comprises a recovery apparatus, at least one shale shaker and at least one recovery shaker. The shale and recovery shaker is a mechanical separator that utilizes vibratory screens to separate drilled mud and its components. The shale shaker of the recovery system comprises at least one screen sizes and a manifold hydrocyclone system. There are numerous hydrocyclone systems in the market. Numerous hydrocyclone systems can be used with this invention including, but not limited to, the 4 Inch Hydrocyclone manufactured by Harrisburg. The recovery apparatus comprises a recovery tank and at least one agitation system. The recovery tank of the recovery apparatus has an inlet, an outlet, a cavity and a tapered base. The recovery shale shaker comprises at least one screen.

In one embodiment, the recovery system comprises a recovery apparatus comprising a recovery tank having a cavity and a base, recovery tank having at least one inlet and at least one outlet. The recovery apparatus has at least one agitation system for creating force within the tank that assists in the separation of the components of the particulate material/drilled solids mixture. The recovery system also has a manifold hydrocyclone system and at least one recovery shaker having at least one screen. The system can further comprise at least one shale shaker having at least one screen, the manifold hydrocyclone system being situated on the shale shaker.

In a further embodiment, a mixture of solid particulate material, drilling fluids, fine particles of drilled and drilled solids enters the shale shaker where drilled solids are separated from the mixture by the screen of the shale shaker. The remaining mixture then enters the recovery tank and is further separated by the centrifugal force created by the agitation system. The remaining mixture of the particulate material, drilled fluids and fine particles of drilled solids are transferred to the manifold hydrocyclone system wherein the particles of drilled solids are separated from the remaining mixture. The mixture then enters the recovery shaker wherein the drilled fluids and solid particulate materials are finally separated.

In still a further embodiment, a mixture of solid particulate material, drilling fluids, fine particles of drilled solids and drilled solids enters into the recovery tank and are separated by a force created by the agitation system. The drilled solids gravitate toward the bottom the tank. The mixture of the particulate material, drilling fluids and fine particles of drilled solids is then transferred to the manifold hydrocyclone system wherein the fine particles of drilled solids are separated from the mixture and the particulate/fluid mixture is then transferred to the recovery shaker wherein the drilling fluid is separated from the solid particulate materials. The pressure required by the hydrocyclone system to separate the fine particles of drilled solids from the mixture is from about 10 lbs. to about 200 lbs.

In another embodiment, the recovery tank of the recovery system has at least three walls, each of the walls having upper and lower ends and the lower ends of at least two walls are tapered toward one another thereby forming a cavity within the recovery tank. In yet another embodiment, the recovery tank can have a multitude of shapes includes rounded walls or funnel shaped walls having a tapered base.

In still another embodiment, the recovery tank further comprises at least one suction manifold and at least one discharge manifold and a dump valve for disposing of drilled solids situated at the base of the tank.

In yet another embodiment, the recovery tank comprises four walls, each of the four walls having upper and lower ends and the lower ends of at least two walls being tapered toward one another thereby forming a cavity within the recovery tank.

In a further embodiment, the recovery tank comprises four walls, each of said walls having upper and lower ends, and said lower ends of four walls are tapered toward one another.

In yet another embodiment, the recovery apparatus may have a two motor and two pump, the second motor and second pump function as a backup. The recovery tank can also have a top portion, a motor control panel and framework for supporting the tank, the pump and the motor.

In yet a further embodiment, the hydrocyclone system of the shale shaker comprises at least one cone. The hydrocyclone manifold system is a separation device that utilizes a liquid such as water, oils, diesel, synthetic or oil-based muds, salt water, etc. to create centrifugal force for separation. The manifold is a pipe with an inlet and outlet used to separate solids from liquids. The cone is a separation device wherein the drilling fluid is pumped tangentially into the cone and the cone creates fluid rotation that provides centrifugal force to separate particles by mass weight. The system also comprises conduits for connecting the recovery apparatus, the shale shaker and the recovery shaker. The conduits are tubings, pipings and the like utilized to transport the drilling components through the recovery system of the present invention. The screen size of screens in the shale shaker and the recovery shaker can be from about 2 to about 350 mesh. In yet another embodiment, the shale shaker has a series of three different mesh screens, a first screen having a screen size from about 4 to about 100 mesh, a second screen having a screen size from about 4 to about 100 mesh, and a third screen having a screen size from about 4 to about 250 mesh. In still yet another embodiment, the recovery shaker has a series of two mesh screens and the screen sizes are from about 4 to about 325 mesh.

In another embodiment the agitation system in the recovery system of the present material can be a geared agitator, a pump agitator, or a pneumatic agitator. In still another embodiment, the agitation system creates movement in the drilling fluid or separation liquid. In yet another embodiment, the agitation system creates a suspension within the tank whereby the solid particulate material are separated from drilled solids. In still yet another embodiment, the agitation system creates centrifugal force that assists in the separation process. In another embodiment, the agitation system creates turbulent force within the cavity to separate the components of the mixture in the tank. The agitation system provides a pressure from about 5 lbs. to about 200 lbs. to separate the components of mixture inserted in the recovery tank. The pressure is dependent on the viscosity of drilling fluid and the weight of solid particles material and the drilled solids.

The present invention also relates to an improved method for continuously recovering solid particulate material from drilled solids, drilling fluids and mixtures thereof during drilling and excavation applications. The method comprises: (a) inserting a mixture of solid particulate material, drilling fluids, and drilled solids of various sizes into a shale shaker having a manifold hydrocyclone system and at least one screen and separating the drilled solids from the mixture using the screen of the shale shaker, (b) directing the remaining mixture in (a) into a recovery apparatus having at least one agitation system and a recovery tank with a tapered base, and separating the solid particulate material, the drilling fluid and the fine particles of drilled solids using a force created by the agitation system; (c) directing the remaining mixture in the recovery tank to the hydrocyclone manifold wherein the fine particles of drilled solids are separated from the fluid and solid particulate materials and; (d) directing the particulate materials and fluids in (c) into a recovery shaker having at least one screen and separating the particulate material from the fluids using the screen of the recovery shaker.

In one embodiment, the method further comprises the step of providing a plurality of conduits for connecting the shale shaker to the recovery apparatus and the recovery apparatus to the recovery shaker. In another embodiment, the recovery tank further comprises at least one suction manifold and at least one discharge manifold and the method further comprises the step of transferring the mixture from the recovery tank to the hydrocyclone manifold system using the suction and discharge manifolds.

In still another embodiment, the recovery tank comprises a dump valve and the method further comprises the step of disposing of drilled solids from the tapered base of the recovery tank.

In yet another embodiment of the invention, the method further comprises the step of recycling the drilling fluids by reinserting the fluids from the recovery shaker into the recovery apparatus. In a still further embodiment, the clean solid particulate materials can be reused with a preexisting mud system. The method can also comprise removing the fine particles of drilled solids from the shale shaker and recovery apparatus and providing a container for retaining the drilled solids.

In yet a further embodiment, the recovery system comprises a structural framework for supporting the recovery apparatus and the shale and recovery shakers, and a motor control panel for operating the motor and the pump. In still a further embodiment, the shale shaker of the method of the present invention may have a series of three different mesh screens, a first screen having a screen size of 4 to about 100 mesh, a second screen having a screen size from about 4 to about 250 mesh and a third screen having a screen size of from about 4 to about 250. In yet still a further embodiment, the recovery system has a pair of two mesh screens having a screen size of 4 to 325 mesh. The agitation system can be at least one pump agitator, at least one pneumatic agitator or at least one geared agitator.

In still yet a further embodiment, the present invention provides a method of recovering solid particulate material such as beads from drilling fluids, fine particles of drilled solids, drilled solids and mixtures thereof. In one embodiment, the fine particles of drilled solids cannot be larger than the circumference of the inlet of the hydrocyclone system which is about 1.5 inches. The method comprises the steps of: a) inserting a mixture of solid particulate material, drilling fluids, fine particles of drilled solids and drilled solids into a recovery tank having an agitation system and separating the mixture using a force created by the agitation system and allowing the drilled solids to gravitate to the base of the tank; b) transferring the remaining mixture of solid particulate material, drilling fluids and fine particles of drilled solids to a manifold hydrocyclone system where the fine particles of drilled solids are separated from the fluid/particulate mixture material and e) separating the drilling fluid from the remaining fluid/particulate mixture in the recovery shaker to isolate and recover the solid particulate material.

BRIEF DESCRIPTION OF THE DRAWINGS

A more complete appreciation of the present invention and many of the attendant advantage thereof will be readily understood by reference to the following description when considered in connection with the accompanying drawings in which.

DETAILED DESCRIPTION OF THE PREFERRED EMBODIMENT

Figure 1:
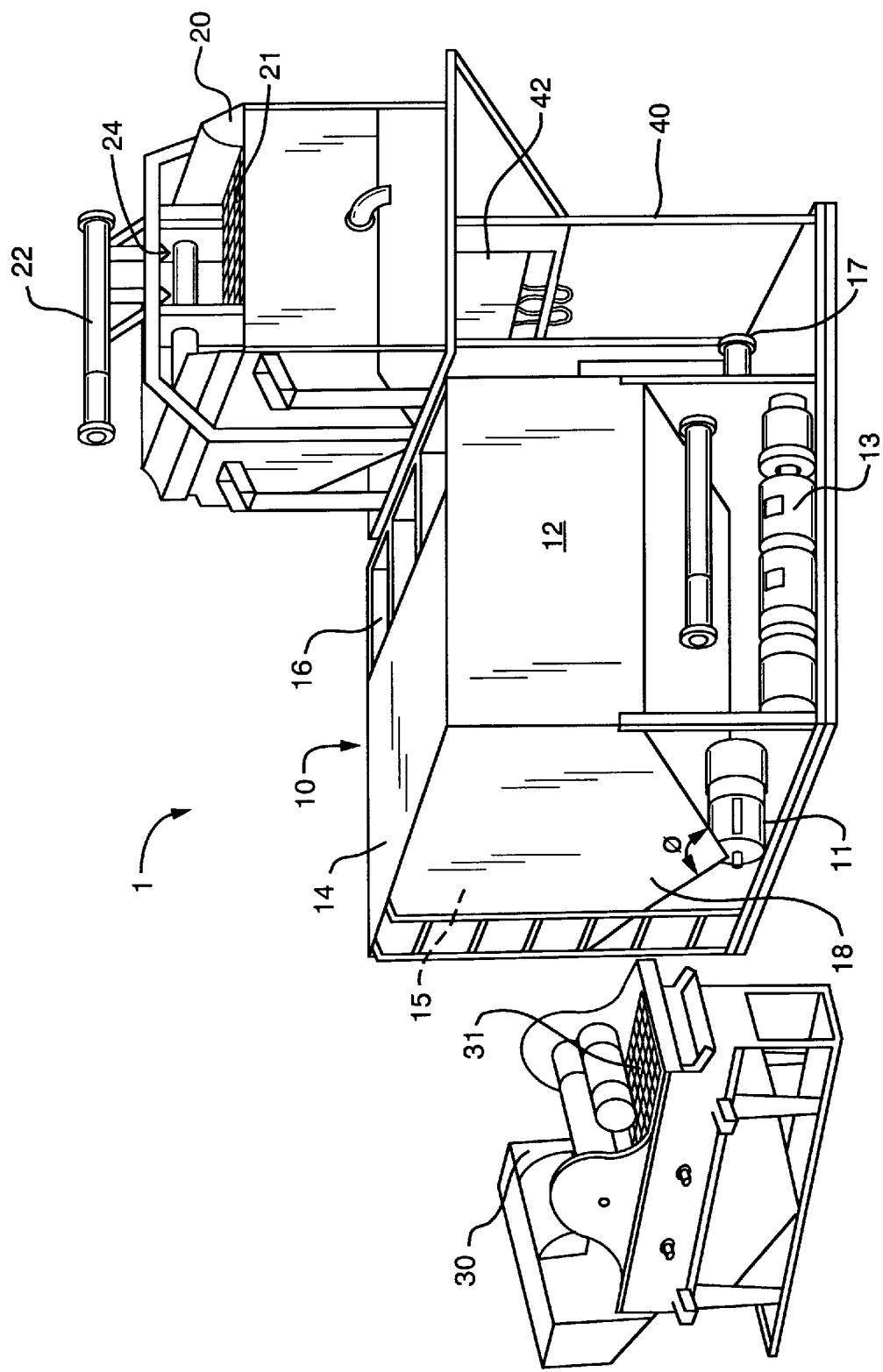
FIG. 1 depicts a perspective view of the recovery system in accordance with the present invention.

Referring now to the drawings wherein like reference numerals designate identical or corresponding parts throughout the several views, and particularly, to FIG. 1 wherein a continuous recovery system in accordance with the present invention, generally designated 1, comprises at least one shale shaker 20 with a plurality screens 21 having varying screen sizes and a manifold hydrocyclone system 22; a recovery apparatus 10 comprising a recovery tank 12 having a cavity 15 and a tapered base 18, the tank 12 having an inlet 16 and outlet 17 and at least one pump 11 and at least one motor 13; and at least one recovery shaker 30 having a plurality of screens 31 with varying screen sizes. The recovery apparatus 10 further comprises a framework 40 for supporting the tank 12, the pump 11 and the motor 13. The recovery apparatus 10 may also have a motor control panel 42.

The recovery tank 12 may also have a top portion 14 for enclosing the cavity 15.

In a further embodiment, the recovery tank 12 comprises four walls, each of the walls having upper and lower ends, and the lower end of the two walls are tapered toward one another to form the tapered base 18.

In still another embodiment, the hydrocyclone system 22 of the shale shaker 20 comprises at least one cone 24. The screen sizes of the screens, 21 and 31, respectively, of the shale and recovery shaker, 20 and 30 respectively, is from about 2 to about 350 mesh. In still a further embodiment, the shale shaker 20 has a series of three different mesh screens 21, a first screen having a screen size from about 4 to about 100 mesh, a second screen having a screen size from about 4 to about 250mesh, and a third screen having a screen size from about 4 to about 250 mesh. In yet a further embodiment, the recovery shaker 30 has a pair of two mesh screens, the mesh screen 31 having a screen size from about 4 to about 325 mesh.

Figure 2B:
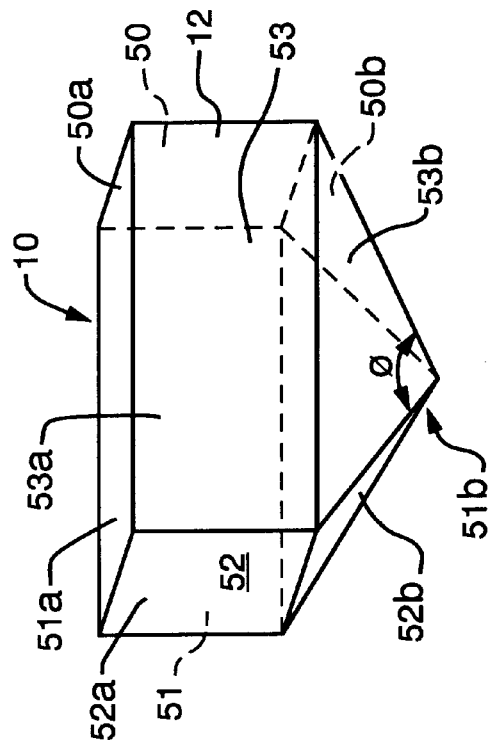
FIGS. 2a–b depict a perspective view of two different embodiments of the recovery tank of the recovery apparatus of the present invention.
Figure 2A:
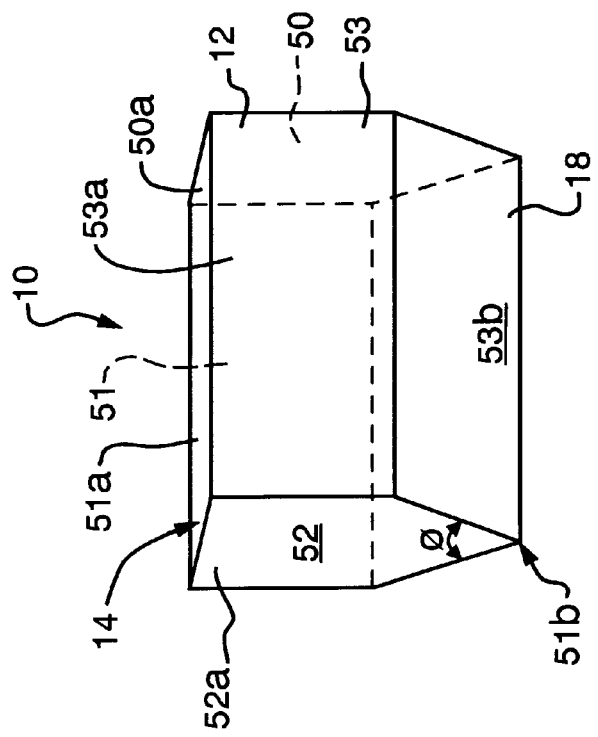

FIG. 2a depicts a perspective view of one of the embodiments of the recovery tank 12 of the recovery apparatus 10 of the present invention. In this embodiment, the recovery tank 12 has a least four walls, 50, 51, 52 and 53, and the walls have an upper ends 50a, 51a, 52a and 53a and lower ends 50b, 51b, 52b, 53b, respectively. The lower ends 51b and 53b are tapered toward one another to form a tapered base 18. The tank may have a top portion 14 for enclosing the recovery tank 12.

FIG. 2b illustrates a perspective view of another embodiment of the recovery tank 12 of the recovery apparatus 10 of the present invention. In this embodiment, the recovery tank 12 comprises at least four walls, 50, 51, 52 and 53, and the walls have an upper ends 50a, 51a, 52a, and 53a and lower ends 50b, 51b, 52b and 53b, respectively. The lower ends 50b, 51b, 52b and 53b are tapered toward one another to form a tapered base 18.

Figure 3:
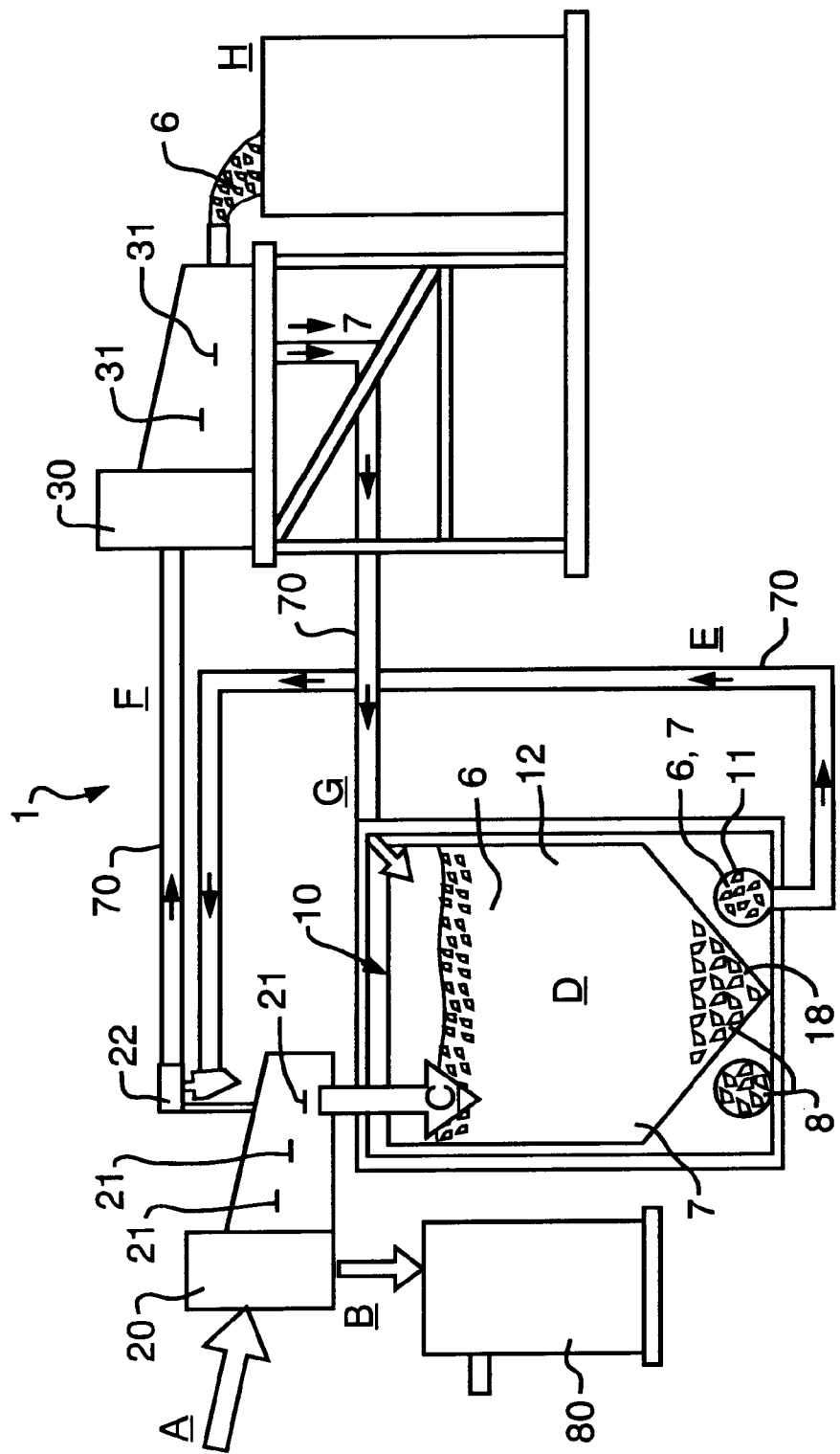
FIG. 3 depicts a diagram view of the continuous recovery system and related methods of the present invention.

FIG. 3 illustrates a diagram of the recovery system 1 of the present invention and the method for continuously recovering solid particulate material such as copolymer beads 6 from drilling fluids 7, drilled solids 8 and mixtures thereof. The method comprises the steps of: (A) inserting a mixture of solid particulate material 6, drilling fluid 7, and drilled solids 8 of various sizes into a shale shaker 20 having a manifold hydrocyclone system 22 and a plurality of screens 21 with varying screen sizes; (B) separating the larger drilled solids of the mixtures using the screens 21 of the shale shaker 20; (C) directing the remaining mixtures into the recovery apparatus 10 having at least one pump 11, at least one motor 13 and a recovery tank 12 with a tapered base 18; (D) separating the particulate material 6, drilling fluid 7 and drilled solids 8 using the centrifugal force created by the agitation system 11; (E) directing the remaining mixture in the recovery tank 12 to the hydrocyclone manifold system 22 wherein in the small drilled solids or fine particles of drilled solids 8 are separated from the fluid 7 and the solid particulate materials 6; and (F) directing the solids particulate material 6 and drilling fluid 7 into a recovery shaker 30 having a plurality of screens sizes 31 and separating the solid particulate materials 6 from the drilling fluid 7.

The system further comprises conduits 70 from connecting the shale shaker 20 to the recovery apparatus 10 and the recovery apparatus 10 to the recovery shaker 30.

In one embodiment, the recovery tank 12 further comprises at least one suction manifold and at least one discharge manifold and further comprises the step of transferring the mixture from the recovery tank 12 to the hydrocyclone system 22 using the suction and discharge manifolds.

In another embodiment, the recovery tank comprises a dump valve and further comprises the step of disposing of the drilled solids from the tapered base 18 of the recovery tank 12 before directing the mixture to the hydrocyclone manifold system 22. In a further embodiment, the method also comprises the step of (G) recycling the drilling fluids 7 by reinstating the fluids 7 from the recovery shaker 30 into the recovery apparatus 10.

In still another embodiment, the method also comprises (H) reusing clean solid particulate material 6 with an existing mud system. In still a further embodiment, the method comprises the step of recovering the large and small drilled solids 8 from the shale shaker 20 and the recovery apparatus 10 and providing a container 80 for retaining the drilled solids 8.

In yet a further embodiment, the shale shaker 20 of the recovery system 1 of the present invention comprises a series of three different mesh screens 21, the mesh screens range from about 4 to about 325 mesh. In still yet a further embodiment, this recovery shaker 30 comprises a pair of mesh screens having a screen size from about 4 to about 325 mesh.

Obviously, numerous modification and variations of the present invention are possible in light of the above teachings. It is therefore to be understood that within the scope of the claims appended hereto, the invention may be practiced otherwise than as specifically disclosed herein.

What is claimed is:

1. A recovery system comprising:

a recovery apparatus comprising a recovery tank having a cavity and a base presenting an inclined surface to said cavity, said recovery tank having at least one inlet and at least one outlet, said recovery apparatus having a least one agitation system for creating a force within said cavity of said recovery tank to assist in the separation of the components of a solid particulate material/drilled solids mixture; a manifold hydrocyclone system coupled to the at least one outlet; at least one recovery shaker, coupled to the manifold hydrocyclone system, and having at least one screen; and at least one shale shaker having at least one screen with varying screen sizes, said manifold hydrocyclone system being situated on said shale shaker;

wherein a mixture of solid particulate material, drilling fluids, thin particles of drilled solids and drilled solids enters said shale shaker and drilled solids are separated from the mixture using said screen of said shale shaker, the remaining mixture then entering said recovery tank and being further separated by the force created by said agitation system, the remaining mixture of the particulate material, drilling fluids and fine particles of drilled solids are transferred to said manifold hydrocyclone system wherein the fine particles of drilled solids are separated from the remaining mixture using the centrifugal force created by said hydrocyclone system, the mixture then entering said recovery shaker wherein the drilling fluid is separated from the solid particulate materials.

2. The recovery system of claim 1 wherein said recovery tank has at least three walls, each of said walls having upper and lower ends, said lower ends of at least two walls being tapered toward one another thereby forming a cavity within said recovery tank.

3. The recovery system of claim 1 wherein said recovery tank further comprises of at least one suction manifold and at least one discharge manifold.

4. The recovery system of claim 1 wherein said recovery apparatus further comprises a framework for supporting said tank and said agitation system.

5. The recovery system of claim 1 wherein said recovery apparatus further comprises a motor control panel.

6. The recovery system of claim 1 wherein said recovery tank further comprises a top portion for enclosing said cavity.

7. The recovery system of claim 1 wherein said recovery tank comprises four walls, each of said walls having upper and lower ends, and said lower ends of two walls are tapered toward an another.

8. The recovery system of claim 1 wherein said recovery tank comprises four walls, each of said walls having upper and lower ends, and said lower ends of four walls are tapered toward an another.

9. The recovery system of claim 1 wherein said hydrocyclone system comprises at least one cone.

10. The recovery system of claim 1 further comprises of conduits for connecting said recovery apparatus, said shale shaker and said recovery shaker.

11. The recovery system of claim 1 wherein the screen size of said screens in said shale shaker and recovery shaker is from about 2 to about 350 mesh.

12. The recovery system of claim 1 wherein said shale shaker has a series of three different mesh screens, a first screen having a screen size from about 4 to about 100 mesh, a second screen having a screen size from about 4 to about 250 mesh, and a third screen having a screen size from about 4 to about 250 mesh.

13. The recovery system of claim 1 wherein said recovery shaker has a pair of mesh screens, said screens having a screen size from about 4 to about 325 mesh.

14. The recovery system of claim 1 wherein said agitation system comprises at least one geared agitator.

15. The recovery system of claim 1 wherein said agitation system comprises at least one pump agitator.

16. The recovery system of claim 1 wherein said agitation system comprises at least one pneumatic agitator.

17. The recovery system of claim 1 wherein the force created by said agitation system is centrifugal force.

18. The recovery system of claim 1 wherein force created by said agitation system is turbulent force.

19. A recovery system comprising:

a recovery apparatus comprising a recovery tank having a cavity and a base presenting an inclined surface to said cavity, said recovery tank having at least one inlet and at least one outlet, said recovery apparatus having a least one agitation system for creating a force within said cavity of said recovery tank to assist in the separation of the components of a solid particulate material/drilled solids mixture; a manifold hydrocyclone system coupled to the at least one outlet; and at least one recovery shaker, coupled to the manifold hydrocyclone system, and having at least one screen;

wherein a mixture of solid particulate material, drilling fluids, fine particles of drilled solids and drilled solids enters into said recovery tank and are separated by the force created by said agitation system within said cavity of said tank, the drilled solids gravitate to said base of said tank, the remaining mixture of particulate material, drilling fluid and fine particles of drilled solids is then transferred to said manifold hydrocyclone system wherein the fine particles of drilled solids are separated from the mixture using the force created by said hydrocyclone system and then a particulate material/fluid mixture is transferred to said recovery shaker wherein the drilling fluid is separated from the solid particulate materials.

20. The recovery system of claim 19 wherein said recovery tank further comprises a dump valve for disposing of drilled solids from said base of said tank.

21. A method for continuously recovering solid particulate material from drilling fluids, fine particles of drilled solids, drilled solids and mixtures thereof, said method comprising the steps of:

a) inserting a mixture of solid particulate material, drilling fluids, fine particles of drilled solids and drilled solids into a shale shaker having a manifold hydrocyclone system and at least one screen and separating drilled solids from the mixture using said screen of said shale shaker;

b) directing the remaining mixture of (a) into a recovery apparatus having at least one agitation system and a recovery tank with a base, and separating the materials, fluids, and particles of drilled solids using a force created by said agitation system within said cavity of said tank;

c) directing the remaining mixture in the recovery tank to said hydrocyclone manifold system wherein the fine particles of drilled solids are separated from the mixture of fluid and solid particulate materials; and d) directing the mixture of solid particulate materials and drilling fluid of (c) into a recovery shaker having at least one screen and separating the solid particulate materials for the drilling fluid using said screen of said recover shaker.

22. The method of claim 21 further comprising the step of providing a plurality of conduits for connecting said shale shaker to said recovery apparatus and said apparatus to said recovery shaker.

23. The method of claim 21 wherein said recovery tank further comprises at least one suction manifold and at least one discharge manifold and the method further comprising the step of transferring said mixture from said recovery tank to said hydrocyclone system using said suction and said discharge manifolds.

24. The method of claim 21 wherein said recovery tank further comprises a dump valve and said method further comprises the step of disposing of the drilling solids from said base of said recovery tank.

25. The method of claim 21 further comprising the step of recycling the drilling fluids by reinserting the fluids from said recovery shaker into said recovery apparatus.

26. The method of claim 21 further comprising the step of reusing the clean solid particulate material with an existing mud system.

27. The method of claim 21 further comprising removing the drilled solids from said shale shaker and said recovering apparatus and providing a container for retaining the drilled solids.

28. The method of claim 21 wherein the solid particulate materials are beads.

29. The method of claim 21 wherein said recovery apparatus further comprises a framework for supporting said tank and said agitation system.

30. The method of claim 21 wherein said recovery apparatus further comprises a motor control panel for operating said agitation system.

31. The method of claim 21 wherein said recovery tank further comprises top portion for enclosing said cavity.

32. The method of claim 21 further comprising a structural framework for supporting said recovery apparatus, said shale and recovery shakers.

33. The method of claim 21 wherein said shale shaker has a series of three different mesh screens, a first screen having a screen size from about 4 to about 100 mesh, a second screen having a screen size from about 4 to about 250 mesh, and a third screen having a screen size from about 4 to about 250 mesh.

34. The method of claim 21 wherein said recovery shaker has a pair of mesh screens, said screens having a screen size from about 4 to about 325 mesh.

35. The method of claim 21 wherein said agitation system comprises at least one geared agitator.

36. The method of claim 21 wherein said agitation system comprises at least one pneumatic agitator.

37. The method of claim 21 wherein said agitation system comprises at least one pump agitator.

38. The method of claim 21 wherein the force created by said agitation system is centrifugal force.

39. The method of claim 21 wherein the force created by said agitation system is turbulent force.

* * * * *